United States Patent [19]

Pittet

[11] 4,015,676
[45] Apr. 5, 1977

[54] RECORDING SCALE, FOR THE RECOVERY OF USED MATERIALS SUCH AS WASTE PAPER

[76] Inventor: Henri Pittet, 6, rue du Mileant, 1203 Geneva, Switzerland

[22] Filed: May 27, 1975

[21] Appl. No.: 581,162

[30] Foreign Application Priority Data

May 25, 1974 Switzerland .................... 7175/74

[52] U.S. Cl. .............................. 177/5; 177/145; 214/2; 232/43.1; 346/10
[51] Int. Cl.² .................................. G01G 23/20
[58] Field of Search ............... 177/12, 13, 59, 62, 177/114, 115, 145, 2–5; 232/43.1–43.5; 312/211; 214/2; 346/9–12

[56] References Cited
UNITED STATES PATENTS 2,960,377 11/1960 Simjian ..................... 177/13 X
3,461,985 8/1969 Allen ....................... 177/13 X Primary Examiner—Joseph W. Hartary
Attorney, Agent, or Firm—Bacon & Thomas

[57] ABSTRACT

A recording scale, for the recovery of used materials such as waste paper. It is provided with weighing means for determining the weight of materials presented and for recording weight which are associated with the weighing means. The means aforesaid are contained in a closed casing having an opening which is accessible from the exterior for the introduction of materials to be recovered, this opening being located opposite to the weighing means for bringing the materials to be weighed onto the means, provision being made for ejecting means operable from the exterior by means of an operating member for releasing the weighing means and transferring the weighed materials into a storage chamber, the operation of the weight-recording means being made dependent on the operation of the ejecting means.

24 Claims, 6 Drawing Figures

RECORDING SCALE, FOR THE RECOVERY OF USED MATERIALS SUCH AS WASTE PAPER

This invention relates to a recording scale, especially for the recovery of used materials such as waste paper.

It is in fact known that paper is a material which is tending to become rare since the consumption of paper pulp tends to exceed the possibilities of natural production, taking into account the periods of time required for the development of trees which supply the basic cellulose material. This results in excessive felling of trees and interferes with preservation of the environment.

This situation could be remedied by a systematic collection of waste paper and the re-use of such paper in the industrial process of manufacture of paper pulp.

The aim of the present invention is to ensure the collection of waste paper under particularly simple, hygienic, attractive and efficient conditions by virtue of the application of specialized equipment which permits the active cooperation of a large section of the population.

There are already a number of known recording-scale systems comprising weighing means for determining the weight of the materials presented and means for recording the weight which are associated with the weighing means, often in an automatic manner. For example, one type of weighing machine which is in fairly common use for persons or materials comprises a rotary drum controlled in dependence on the displacements of a weighing platform. Depending on the weight to be recorded, this drum has raised characters located opposite to a position of printing a recording ticket supplied from a continuous strip. At the moment of weighing, the operator initiates printing of the ticket and can retain this latter.

Recovery of used materials such as waste paper by means of a recording scale of the type mentioned in the foregoing must be performed automatically without requiring the costly presence of an attendant if economic performance of the operation is a primary objective. The recording ticket accordingly constitutes a proof that a package or batch of used materials of predetermined weight has been deposited and enables the operator to obtain payment for this on the basis of an agreed tariff.

In point of fact, scales of known types which are employed without supervision would permit the possibility of presenting the same batch of materials several times and thus of obtaining a number of tickets unrightfully. This fundamental drawback therefore does not make it feasible to employ known scales for the recovery of used materials since this operation is intended to be performed automatically without supervision.

The aim of the invention is to overcome the above-mentioned disadvantage by providing a simple constructional design of recording scale for the recovery of used materials such as waste paper, which is such that repeated recording of any one batch of materials is impossible.

The invention relates to a recording scale, especially for the recovery of used materials such as waste paper, said scale being provided with weighing means for determining the weight of materials presented, and means for recording weight which are associated with the weighing means.

In accordance with the invention, the scale aforesaid is characterized in that the weighing and recording means are contained in a closed casing having an opening which is accessible from the exterior for the introduction of materials to be recovered, said opening being located opposite to the weighing means for bringing the materials to be weighed onto said means; provision is made for ejecting means operable from the exterior by means of an operating member for releasing the weighing means and transferring the weighed materials into a storage chamber, the operation of the weight-recording means being made dependent on the operation of the ejecting means.

The introduction of materials to be recovered into the closed casing prevents the possibility of using the same package or batch several times. The operation of the recording means which is made dependent on the operation of the ejecting means further ensures that a single ticket is printed per batch.

In a preferred embodiment of the invention, the scale comprises a receiving basket which rests on the weighing platform by means of an elastic support which is deformable in the vertical direction; provision is made for locking means whereby the member for operating the ejecting means is maintained in a rest position; said locking means comprise a retracting device controlled by the displacement in compression of the elastic support aforesaid.

As an advantageous feature, the receiving basket is substantially in the form of an open-topped pyramid frustum and hinged on the weighing platform along an axis which is substantially parallel to one side of its base; the elastic means for supporting the basket on the platform is displaced with respect to said axis; the hinged assembly of the basket makes it possible to swing this latter laterally between a receiving position and an ejecting position.

As will be explained hereinafter, the foregoing arrangements permit simple and convenient construction of the scale in accordance with the invention.

Further properties and advantages of the recording scale will become apparent from the following description of a preferred embodiment which is given below by way of example without any limitation being implied, reference being made to the accompanying drawings, wherein.

Figure 1:
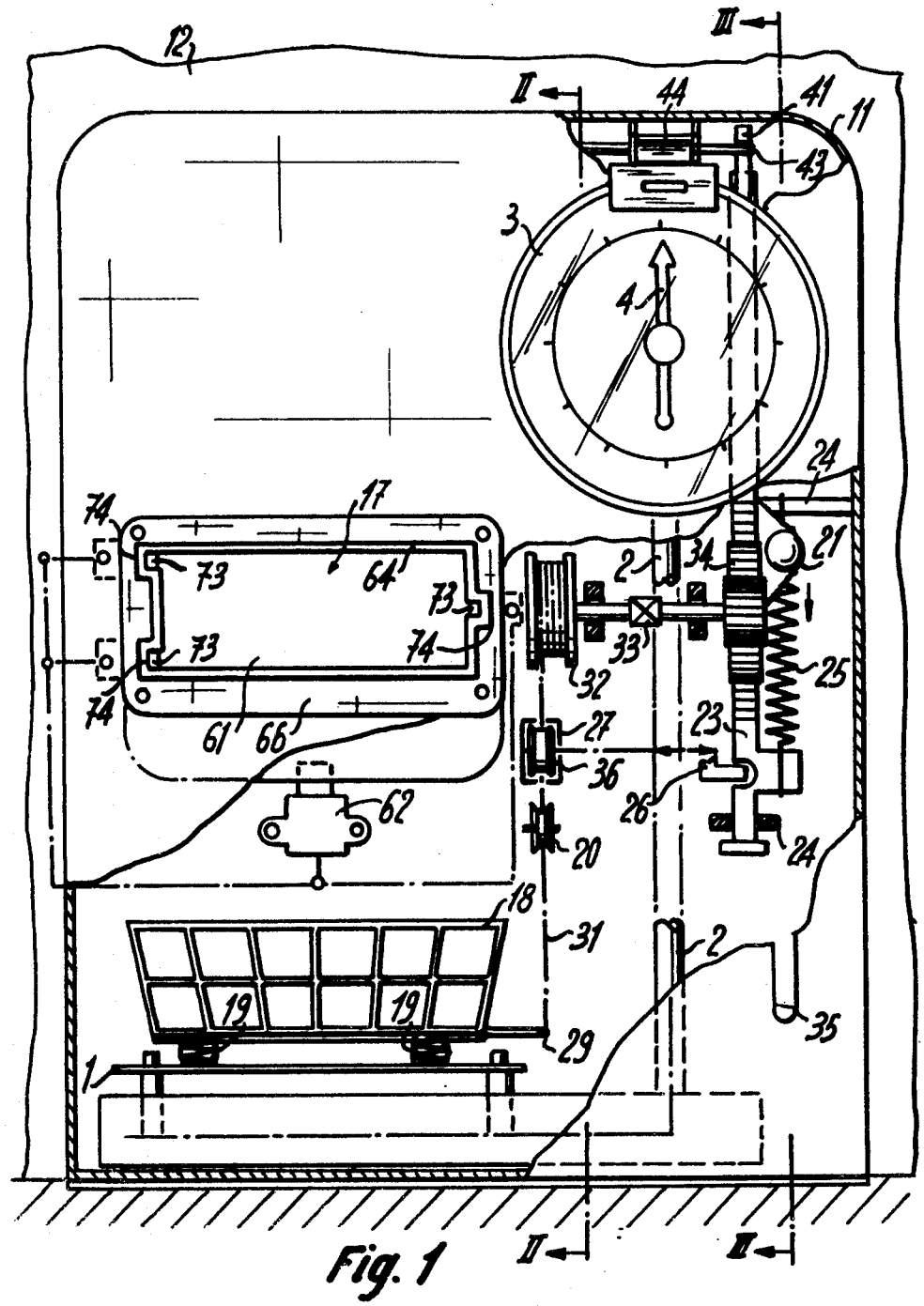
FIG. 1 is a front view with portions broken away and showing a scale in accordance with the invention.
Figure 2:
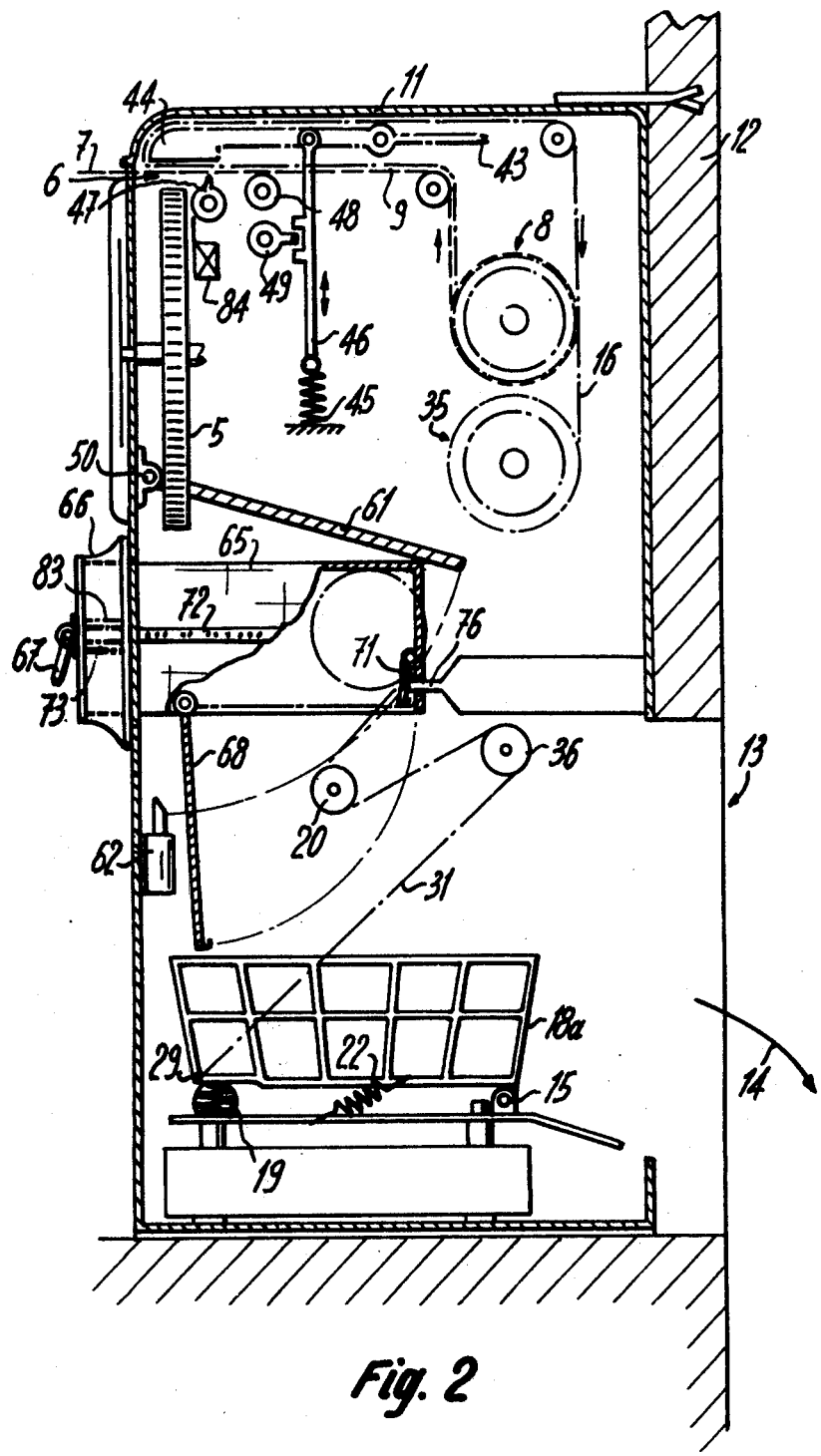
FIGS. 2 and 3 are sectional views of FIG. 1, taken along lines II—II and III—III respectively.
Figure 3:
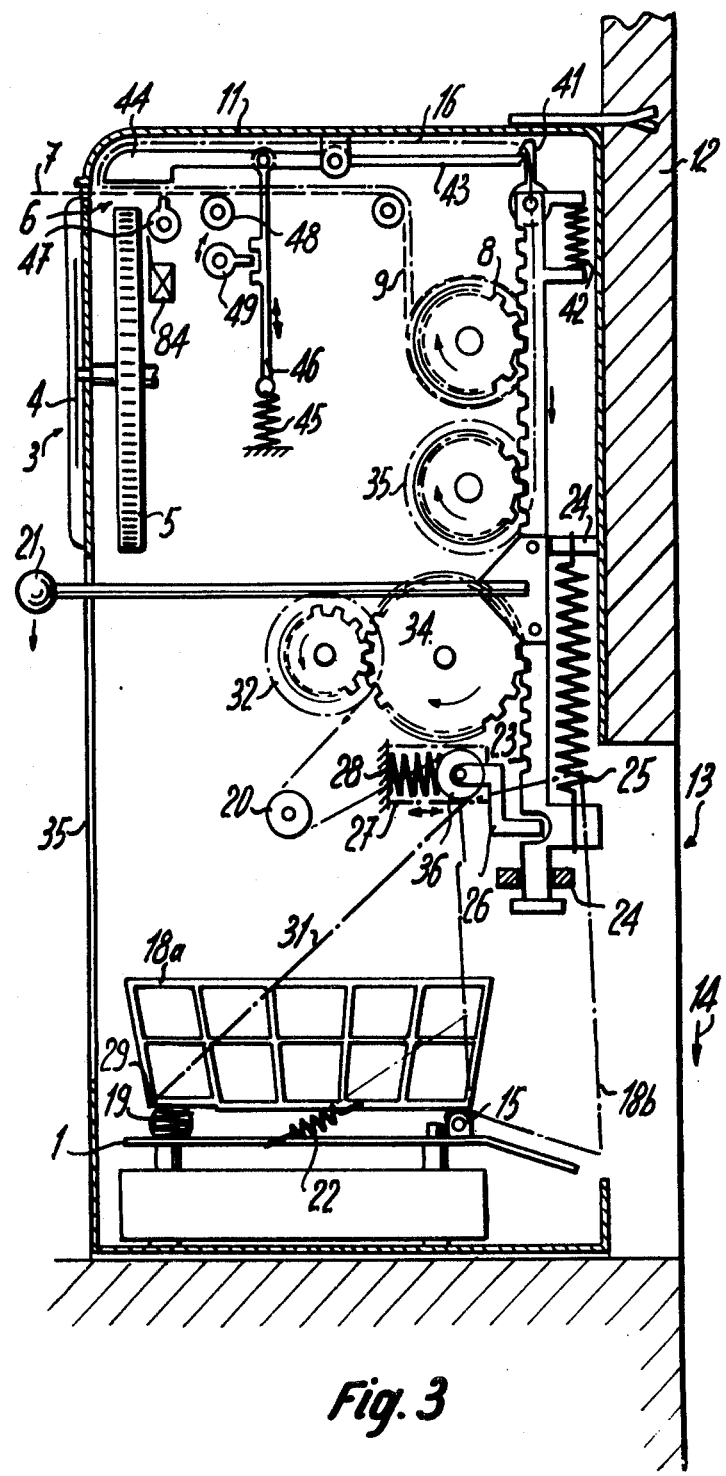

In the embodiment which is illustrated in FIGS. 1 to 3, the recording scale for the recovery of used materials such as waste paper comprises weighing means for determining the weight of materials presented and weight-recording means associated with the weighing means. Said recording means comprise in particular a weighing platform 1 associated by means of a mechanism 2 with an indicating dial 3, the pointer 4 of which is rigidly fixed to a rotating drum 5. Said drum is provided at its periphery with characters corresponding to the weight measured and is intended to place said characters opposite to a printing position 6 according to the weight to be recorded, so as to initiate printing of a recording ticket 7 supplied by a feed system comprising a bobbin 8 which contains a supply of tickets in the form of a continuous strip 9.

In accordance with the invention, the aforesaid weighing and recording means are contained within a closed casing. In the embodiment which is illustrated in the drawings by way of example, the closed casing is constituted by a metallic cabinet or cubicle 11 which is placed on the ground and mounted against a wall 12 in such a manner that only the front face thereof is accessible from the exterior whilst the lower portion of its rear face is provided with an opening located opposite to a wall-opening 13 which communicates with a storage chamber 14 such as a cellar.

The metallic cubicle 11 has an opening 17 which is accessible from the exterior for the introduction of materials to be recovered and is located above the weighing platform 1 for bringing the materials to be weighed on this latter. The weighing platform 1 is surmounted by a receiving basket 18 having the shape of an open-topped pyramid frustum and hinged by pins 15 on the platform 1 along an axis which coincides with one side of its base on the side nearest the wall-opening 13.

The receiving basket rests on the weighing platform by means of an elastic support which is deformable in the vertical direction. Said elastic support comprises two compression springs 19 which are attached to the platform and on which a lower edge of the receiving basket can be applied. The hinged assembly of the receiving basket 18 makes it possible to swing this latter in a lateral direction between a receiving position 18a (FIG. 2) in which the basket rests entirely on the weighing platform and an ejecting position 18b (shown in a chain line in FIG. 3) in which the contents of said basket can be discharged into the storage chamber 14 through the wall-opening 13.

Provision is made for ejecting means which are operable from the exterior by means of an operating handle 21 slidably fitted within a slot 35 for releasing the weighing platform and directing the weighed materials into the storage chamber 14. The operation of the weight-recording means is made dependent on the operation of the ejecting means as will be explained hereinafter.

In the embodiment herein described by way of example, the ejecting means serve to initiate the tilting motion of the receiving basket 18 between the receiving position 18a and the ejecting position 18b. A restoring spring 22 then returns the basket to the receiving position 18a.

The operating handle 21 (shown in FIGS. 1 and 3) is rigidly fixed to a sliding toothed rack 23 which is mounted vertically within the cubicle 11 on support-brackets 24 and normally restored to the rest position as shown in FIG. 3 by a tension spring 25. The toothed rack 23 is normally retained in the aforesaid rest position by a locking-bolt 26 comprising a retracting device controlled by a moving cage 27 which is normally urged by a restoring spring 28 towards the position of engagement of the locking-bolt 26.

One end of a traction cable 31 is fixed at one point 29 of the basket 18 which is located at a distance from its pivotal axis, the cable 31 being wound onto a drum 32 which is capable of moving in rotation and urged in the direction of winding of said cable by an elastic coupling 33 having a limited range of travel. Said coupling connects the shaft of the drum 32 to a driving pinion 34 which is associated with the toothed rack 23.

Between the point of attachment 29 of the cable 31 to the receiving basket 18 (as shown in FIG. 3) and the winding drum 32, the path of the cable 31 follows a zig-zag path about two guide pulleys. One guide pulley 36 is mounted on the moving cage 27 which has already been mentioned with reference to the locking-bolt 26. The direction of the lengths of the cable 31 adjacent the pulley 36 is such that a tension of the cable 31 produces action on the cage 27 so as to compress the oppositely-acting spring 28 in the direction of withdrawal of the locking-bolt 26.

Adjusting means (not shown in the drawings) are provided for adapting in accordance with requirements the length of the cable 31, the tension of the oppositely-acting spring 28 and the elastic couple of the limited-travel coupling 33. When the basket 18 is empty, it can thus be maintained in the receiving position 18a with its free edge at a given distance from the weighing platform 1. Under the action of a predetermined load such as 1 kilogram for example, which corresponds to the bottom recording limit, the compression of the springs 19 and 28 and the deformation of the elastic coupling 33 permit the displacement of the locking-bolt 26 and the release of the sliding toothed rack 23.

At the top end of the rack 23 (as shown in FIGS. 1 and 3), an escapement catch 41 associated with a restoring spring 42 is engaged in the rest position of the toothed rack 23 against a lever 43 for actuating an oscillating hammer 44 placed opposite to the printing position 6 on the other side of the strip 9 with respect to the drum 5. A spring 45 associated with the articulated rod 46 urges the hammer 44 in the direction of the drum 45 so as to initiate printing of the strip 9 as will be explained hereinafter.

A cutter 47 is placed opposite to the hammer 44 on the other side of the strip 9 in order to cut-off the recording ticket 7. The strip 9 is formed of two superposed thicknesses: on the side nearest the cutter 47, a narrow strip is provided in order to be cut-off by said cutter and to supply a recording ticket 7 at each operation of the scale as will be described below. On the side nearest the hammer 44, a strip 16 of greater width than the cutter 47 retains intact edges after cutting of the ticket 7 and remains inside the cubicle 11 of the scale so as to constitute a check-strip which is wound onto a bobbin 35 as described hereinafter.

As shown in FIG. 3, the toothed rack 23 is associated with two driving pinions each coupled with a bobbin 8, 35 by means of a mechanism (not shown) comprising a freewheel escapement, a tension spring and a friction clutch. This device ensures that tension is maintained on the double strip 9 and on the check-strip 16 by producing action on the bobbins 8, 35 each time the toothed rack 23 is operated.

The feed motion of the double strip 9 and of the check-strip 16 is produced by a pair of driving rollers 48 associated with a spring mechanism (not shown), the rewinding of which is carried out at each operation of the toothed rack 23 by means, for example, of a mechanical connection with the driving pinion of the bobbin 8. A releasing cam 49 actuated by bosses of the articulated rod 46 actuates the driving mechanism of the driving rollers 48 at each operation of the recording scale as explained hereinafter.

In order to control the introduction of materials to be recovered within the cubicle 11, the opening 17 is preferably fitted with a hinged shutter 61 associated with a latch 62 for maintaining said shutter in the normally closed position and for allowing opening this latter only at the moment of introduction of materials through the opening 17.

A standardized key system is provided for actuating the latch 62. The key is either of a conventional mechanical type, for example, or constituted by a magnetic card acting upon a magnetic latch-release detector combined with the latch 62. The key is preferably provided with identification marks and provision is made for a comlementary device for recording said marks on the recording ticket 7 and on the check-strip 16.

Figure 4:
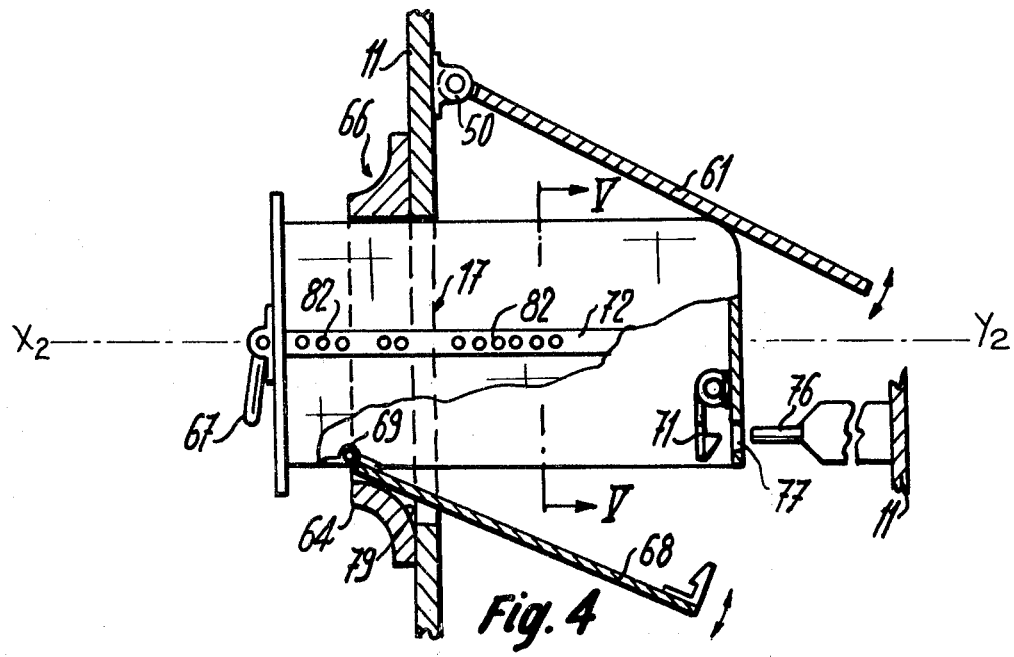
FIGS. 4, 5, 6 illustrate a calibrated packing unit which is intended to be employed with the scale as shown in FIG. 2.
Figure 5:
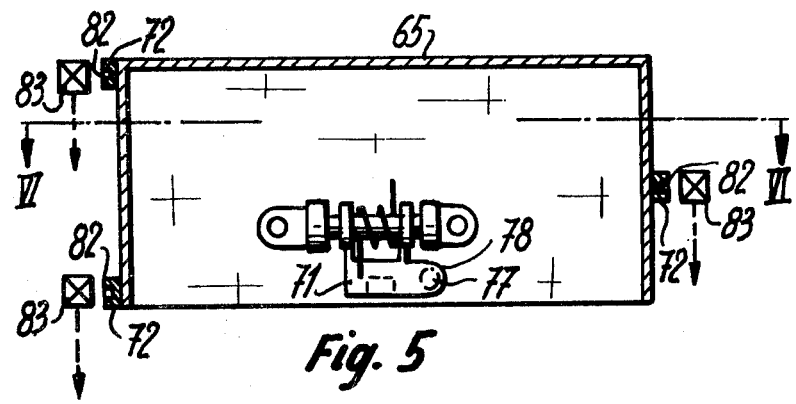
Figure 6:
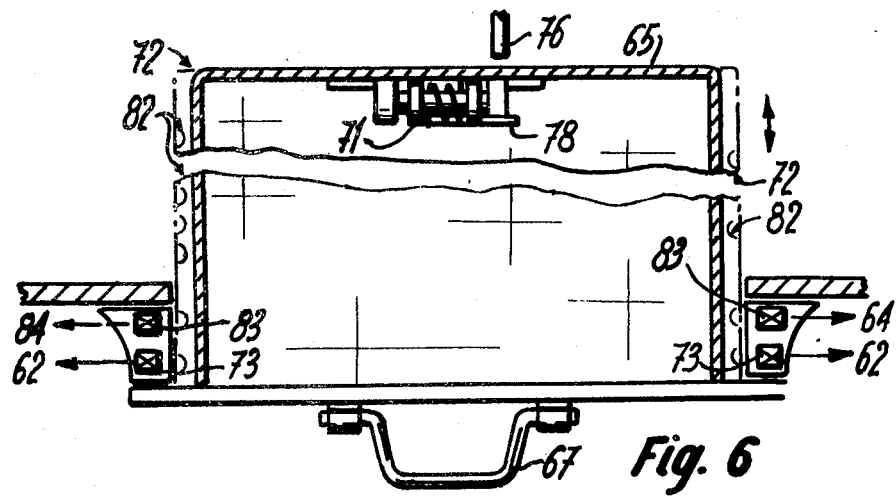

In the embodiment described herein by way of example, the standardized key is constituted by a calibrated packing unit 65 (as shown in FIGS. 4 to 6) which serves to carry out the preliminary collection of used materials and to introduce these latter into the scale. There is associated with the calibrated packing unit 65 an interchangeable shaped plate 66 mounted on the introduction opening 17. Said plate 66 can have a number of different profiles adapted to various calibrated packing units such as the unit 65 so as to define the axis X2-Y2 of introduction of said unit through the opening 17.

The calibrated packing unit 65 which is preferably parallelepipedal consists of a box formed for example of light-metal sheet or of reinforced plastic material fitted with a carrying handle 67 on one face and provided with a hinged bottom 68 which is maintained in the normally closed position by a catch 71 attached to that face of the box which is remote from the handle 67. Between the two faces aforesaid, two walls of the box are provided with shaped projecting strips 72 which are parallel to the axis of introduction X2-Y2 and constituted for example by metallic tubes or strips which are permanently riveted in position. The parallel projecting strips 72 are spaced along the opposite lateral walls of the packing unit 65 in an assymetric manner so as to define the position of introduction within the opening 17 (as shown in FIG. 4). In this position, the hinged bottom 68 is located directly above the receiving basket 18 (as shown in FIG. 2).

In order to release the shutter 61 at the moment of introduction of the packing unit 65, means for detecting the introduction of the calibrated packing unit are disposed within the guiding plate 66 and associated with the latch 62.

In the embodiment described herein by way of example, the detection means aforesaid comprise (as shown in FIGS. 1 and 6) contact push-rods 73 fitted within recesses of the guiding plate 66 and corresponding to the shaped projecting strip 72 of the packing unit 65. Each projecting strip 72 on the side opposite to the handle 67 has a rounded end in order to facilitate the introduction of said strip into the recesses. The withdrawal of the contact push-rods 73 has the effect of closing a circuit (shown in FIG. 1) which initiates the opening of the latch 62 of the shutter 61.

Opening of the catch 71 which retains the hinged bottom 68 is controlled by a stud 76 which is stationarily fixed on the rear wall of the cubicle 11. The stud 76 is capable of penetrating into a hole 77 of the wall of the packing unit 65 opposite to a lateral lug 78 of the catch 71 so as to actuate this latter at the end of the movement of introduction of the packing unit 65 into the scale. A rounded lower bearing surface 79 of the guiding plate 66 (shown in FIG. 4) again effects the closure of the hinged bottom 68 at the moment of withdrawal of the packing unit 65.

Said packing unit 65 is advantageously provided with marking means for defining an identification number of the unit. Means for reading said marking means are mounted on the scale and associated with the complementary recording means already mentioned for the purpose of recording the identification number of the packing unit 65.

In the embodiment herein described by way of example, the means for marking the packing unit comprise hollow marks 82 formed on the shaped projecting strips 72 and spaced in the direction of the axis of introduction X2-Y2. The means for reading these marks 82 comprise elastic fingers 83 (as shown in FIG. 6) each associated with a contactor and disposed within the recesses of the guiding plate 66 in proximity to the push-rods 73. The contactors of the elastic fingers 83 are connected by means of a suitable circuit to a counting and indicating device 84 of known type which is placed next to the drum 5 in proximity to the printing position 6 (shown in FIGS. 2 and 3) so as to print the identification number of the packing unit 65 on the recording ticket 7 and on the check-strip 16 under the action of the hammer 44.

The operation of the recording scale which has just been described will now be explained.

The calibrated packing unit 65 (shown in FIGS. 4 and 2) is employed for preliminary collection of materials to be recovered and can contain by way of example four kilograms of newspapers or like publications. Before introducing the packing unit into the scale, it is first ensured that the hinged bottom 68 is closed and maintained in position by the catch 71.

By placing the calibrated packing unit 65 in position within the guiding plate 66, the shaped projecting strips 72 cause the withdrawal of the push-rods 73 which close the operating circuit of the latch 62, thus releasing the shutter 61 (shown in FIG. 4) for the introduction of the packing unit 65 into the scale along the axis X2-Y2. During this movement, the marks 82 are displaced in continuous relative motion in front of the elastic fingers of the reading means 83 and indicate on the complementary recording means 84 (shown in FIG. 2) the identification number of the packing unit corresponding to the arrangement of the marks 82 on the projecting strips 72.

When the packing unit 65 has been introduced into the scale to the full extent, the stud 76 (shown in FIG. 4) penetrates into the hole 77 and actuates the catch 71, thus releasing the hinged bottom 68 which allows the contents of the packing unit 65 to fall into the receiving basket 18 (shown in FIG. 2). Under the action of the weight which is thus added to the basket 18, this latter compresses the springs 19 of its elastic support and causes by means of the cable 31 the displacement of the pulley 36, against the action is spring 28, thus releasing the locking bolt 26 of the toothed rack 23.

The handle 21 can then be operated in the downward direction as indicated in FIG. 3. As a consequence, the escapement catch 41 displaces the lever 43 downwards and this latter is freed from said catch at the end of a range of travel of a few centimeters. Under the action of the spring 45, the hammer 44 serves to print the ticket 7 and the check-strip 16 by striking them against the drum 5 in the printing position. At the same time, the cutter 47 cuts-off the ticket 7 and the bosses of the rod 46 actuate the cam 49, thus ensuring the forward motion of the double strip 9, of the ticket 7 and of the check-strip 16. In consequence, the recording ticket 7 is discharged from the cubicle 11 within reach of the operator who will thus be able to obtain payment for the used materials which he has introduced into the scale.

In addition to the weight of these materials recorded by means of the characters presented in the printing position 6 by the drum 5, the scale also carries out the recording of the identification number of the packing unit 65 as a result of the reading of the marks 82 (FIGS. 4 and 6) carried out by the reading means 83 and communicated to the counting means and to the complementary recording means 84 (shown in FIGS. 2 and 3).

All these indications appear both on the recording ticket 7 and on the check-strip 16 so as to facilitate all the necessary checking operations.

By continuing the downward displacement of the toothed rack 23, the cable 51 is wound onto the drum 32, thus causing lateral tipping of the receiving basket 18. Said basket moves to the ejecting position 18a and the materials to be recovered which were supplied by the calibrated packing unit 65 are discharged from the basket through the wall-opening 13 into the storage chamber 14.

When the toothed rack 23 is released, this latter returns upwards under the action of the restoring spring 25 into the rest position shown in FIGS. 1 and 3, thereby allowing the locking-bolt 26 to return to the position of engagement and to lock the toothed rack 23 in position until the following operation.

The recording recovery scale which has just been described provides a number of important advantages over recording scales of known types.

The arrangement of the weighing means and recording means within the closed cubicle 11 prevents fraudulent operation so that the same batch of materials to be recovered can no longer be recorded several times. The operation of the recording scale in accordance with the invention can accordingly be performed without any supervisory personnel.

Since the recording means are made dependent on the operation of the ejecting means which release the weighing means in an irreversible manner, the safety of the operation is enhanced in regard to the fraudulent practices mentioned above.

The system 62 for locking the shutter 61 associated with the detection means 73 prevents any introduction of materials other than by means of a special calibrated packing unit 65 which is delivered solely to certain known persons.

The complementary recording means associated with the means for reading marks carried by the calibrated packing unit 65 serve to determine the identity of the user of said packing unit.

The aforesaid indications as well as the indication of the weight of materials introduced at each operation are retained on the check-strip 16 for any subsequent verifications.

It is readily apparent that the invention is not limited to the embodiment which has just been described and that many alternative forms may be devised without thereby departing either from the scope or the spirit of the invention.

I claim:

1. A recording scale, especially for the recovery of used materials such as waste paper, said scale comprising:
   a. a weighing means;
   b. a closed casing enclosing said weighing means for determining the weight of materials presented;
   c. means for recording weight determined by the weighing means;
   d. means defining an opening in said casing and accessible from the exterior thereof for introduction of materials to be recovered, said opening being located opposite to said weighing means for bringing the materials to be weighed onto said weighing means, and
   e. ejecting means for transferring the weighed materials from said weighing means into a storage chamber, said ejecting means including an actuating member accessible from the exterior of said casing for operation of the ejecting means, and means normally holding said actuating member in a locked position and releasing said actuating member to allow operation of the ejection means in response to actuation of the weighing means, the weight-recording means being operable in response to operation of said ejecting means.

2. A scale in accordance with claim 1 further comprising:
   a. a weighing platform,
   b. a receiving basket resting on said platform,
   c. an elastic support which is deformable in the vertical direction in the operating position of the scale, said basket resting on said platform by means of said elastic support,
   d. locking means for maintaining the member for operating the ejecting means in the rest position, said locking means including a retracting device controlled by a displacement in compression of said elastic support.

3. A scale in accordance with claim 2, in which said receiving basket is substantially in the form of an open-topped pyramid frustum hinged on the weighing platform along an axis parallel to one side of its base for lateral pivotal motion between a receiving position and an ejecting position.

4. A scale in accordance with claim 3, in which the basket is connected to the member for operating the ejecting means by a mechanical coupling element attached to said basket at a point remote from said axis.

5. A scale in accordance with claim 4, in which said mechanical coupling element comprises a traction cable wound onto a rotatable drum operatively connected to the operating member of the ejecting means.

6. A scale in accordance with claim 5, in which said cable passes between points of attachment to the receiving basket and to said rotatable drum about a displaceable guide pulley connected to the retracting device for unlocking the operating member of the ejecting means.

7. A scale in accordance with claim 2 in which said elastic support of said receiving basket on said weighing platform comprises a restoring spring for returning said basket to the receiving position after operation of the ejecting means.

8. A scale in accordance with claim 5 in which said ejecting means comprise a toothed ejection rack meshing with a pinion for driving said rotatable drum, said toothed rack being maintained by said locking means in an initial position corresponding to the receiving position of the receiving basket, and spring means for returning the ejection rack into said initial position after operation of the ejecting means.

9. A scale in accordance with claim 8, comprising a member for controlling said recording means in response to movement of said toothed rack of said ejecting means.

10. A scale in accordance with claim 1, in which said recording means comprise a rotary recording drum rotatable in response to operation of the weighing means, said recording drum having raised weight-indicating characters that are located opposite to a position of printing of a weight-recording ticket according to the weight to be recorded, a printing hammer intended to strike the recording ticket in said printing position, the ejecting means including a control member for actuating the printing hammer.

11. A scale in accordance with claim 10 in which the recording means comprise a supply of recording tickets in the form of a continuous strip and a mechanism for driving the strip at each operation of the scale, and the ejecting means comprise a control member for actuating the strip-driving mechanism.

12. A scale in accordance with claim 11, in which said supply of tickets comprises a double strip, one portion of which terminates at the exterior of said casing so as to present a recording ticket to the operator, the other portion remaining inside the scale casing in order to retain therein a check ticket which is printed at the same time as the recording ticket.

13. A scale in accordance with claim 12, further comprising means for cutting off the recording ticket in response to actuation of said printing hammer.

14. A scale in accordance with claim 13, further comprising a shutter mounted on the introduction opening for movement between a closed position and an open position, and locking means for maintaining said shutter in the closed position and for allowing opening of said shutter only in response to introduction of materials into said opening.

15. A scale in accordance with claim 14 in which said locking means comprises means for receiving a standard key provided with identification marks, and comprising means for reading the identification marks of a key received in said locking means and a device for recording corresponding identification marks on the recording ticket and on the check ticket.

16. A scale in accordance with claim 1, in combination with at least one calibrated packing unit which serves to collect used materials and to introduce said materials into the scale, said introduction opening being shaped to receive a calibrated packing unit.

17. A scale in accordance with claim 16, further comprising a plurality of interchangeable shaped inlet plates removably securable on said casing about said introduction opening, said plates having different profiles defining openings for receiving calibrated packing units of corresponding profiles.

18. A scale in accordance with claim 17, in which each inlet plate includes guide means adapted to the profile of a corresponding packing unit to define an axis of introduction of said unit into the opening.

19. A scale in accordance with claim 18, in which each packing unit comprises shaped projecting strips parallel to said axis of introduction when the packing unit is introduced into the corresponding inlet plate.

20. A scale in accordance with claim 19, in which said shaped projecting strips of the packing unit are irregularly spaced along sides of the unit so as to define a position of introduction of said unit into the opening.

21. A scale in accordance with claim 17 in which the shutter is mounted inside the casing and the inlet plate is mounted outside the casing, and comprising means for detecting the introduction of a calibrated packing unit in the inlet plate for actuating said means for locking the shutter so as to release said shutter in response to said introduction of a packing unit.

22. A scale in accordance with claim 16 in which each calibrated packing unit has a hinged bottom and a catch for maintaining the bottom closed during introduction of the packing unit into the opening of the casing, said casing including means for actuating said catch to open the bottom of the packing unit on completion of the movement of introduction.

23. A scale in accordance with claim 16, in which each packing unit comprises marking means defining an identification number of said unit, and the scale comprises means for reading said marking means of a packing unit introduced in said opening and means for recording the identification number of the packing unit.

24. A scale in accordance with claim 23, in which the marking means of the packing unit comprise marks disposed on shaped projecting strips of said unit, said strips defining an axis of introduction of said unit in said opening, said marks being spaced in the direction of the axis of introduction, and said reading means being placed on said casing adjacent the introduction opening and being responsive to said marks of the packing units.

* * * * *